Sept. 30, 1941. C. A. CAMPBELL 2,257,226
AIR BRAKE
Filed Feb. 23, 1940
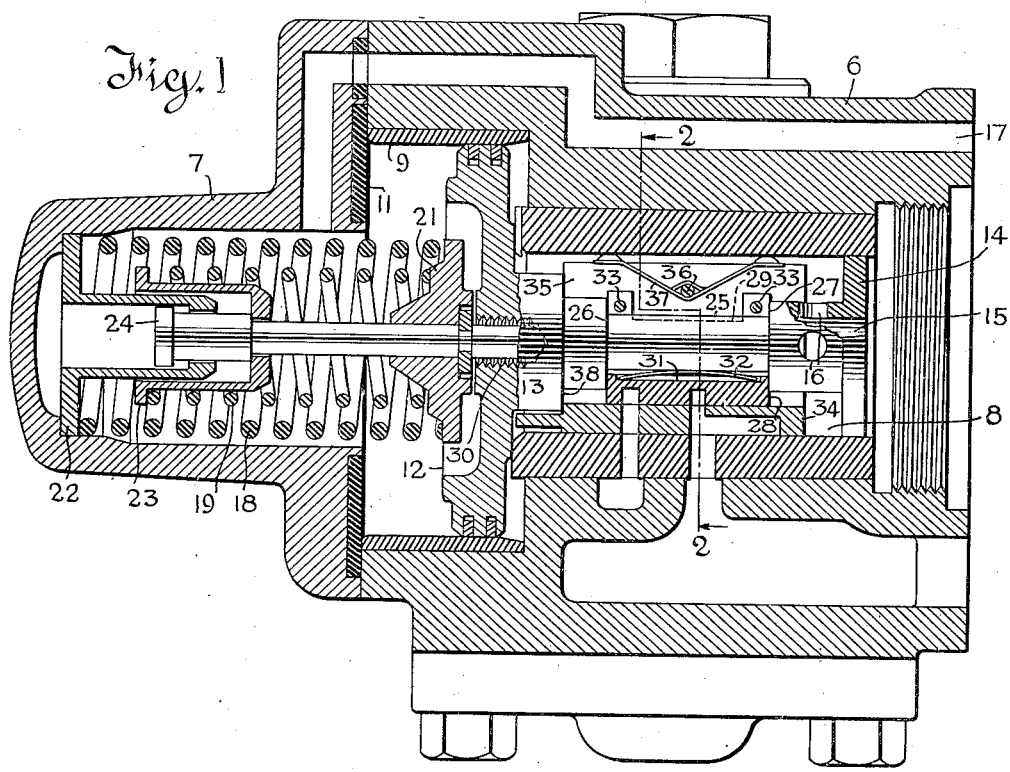
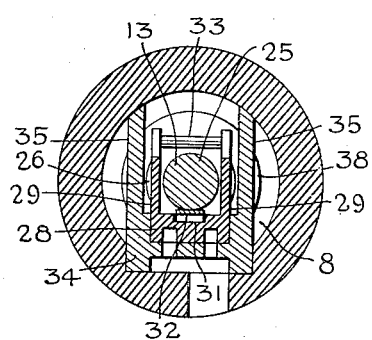
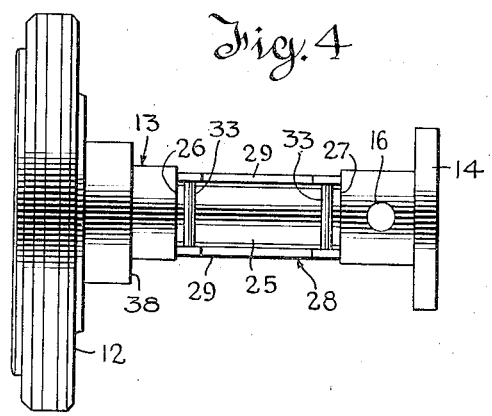
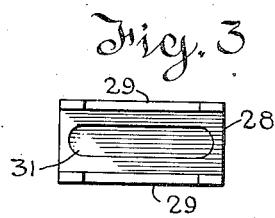
Inventor
Charles A. Campbell
By
Dodge and Sons
Attorneys Patented Sept. 30, 1941

2,257,226

UNITED STATES PATENT OFFICE 2,257,226

AIR BRAKE

Charles A. Campbell, Watertown, N. Y., assignor to The New York Air Brake Company, a corporation of New Jersey Application February 23, 1940, Serial No. 320,488

2 Claims. (Cl. 303—1)

This invention relates to fluid pressure brakes and like devices, and has to do with the mounting of graduating valves on the usual piston-actuated stem.

In certain types of valves, the stem is so arranged as to hold the piston against rotary motion in the cylinder, and this arrangement is satisfactory where the piston is used without any spring mechanism or is used with a spring mechanism so contrived that no rotary tendency is imparted by it to the piston.

However, in certain types of valves, the piston is loaded by a coil compression spring unit which may be made up of one or more coil compression springs, the springs being mounted under initial stress. In such case, the engagement between the end of the spring and the piston is such that the rotary motion of the end of the spring as the spring is compressed imparts a rotary tendency to the piston.

To avoid imparting this rotary tendency to the graduating valve, it has been proposed to construct the stem in such a way that it may rotate freely relatively to the graduating valve, but in no such constructions heretofore known are the graduating valve, the stem and the seating spring for the graduating valve held in assembled relation. Consequently, the prior art devices of this type are very difficult to assemble by inserting the valve unit through the cylinder into the slide valve chamber.

The present invention provides a construction in which the necessary freedom of motion is provided and at the same time the parts are held in such assembled relation that insertion of the valve unit into the slide valve chamber is comparatively a simple matter.

A preferred embodiment of the invention will now be described in connection with the accompanying drawing, in which:

Figure 1 is a longitudinal axial section through a valve embodying the invention.

Figure 2 is a section on the line 2—2 of Figure 1.

Figure 3 is a plan view of the graduating valve.

Figure 4 is a plan view of the graduating valve assembled with the piston stem.

In the drawing, 6 represents the valve body or housing, and 7 the front cap. In the body 6, there is a bushed slide valve chamber 8 and a communicating bushed cylinder 9. A gasket 11 is interposed between the body and the front cap and offers a seat for the valve-actuating piston 12 when the latter moves outward to its limit (i. e. to the left, as viewed in Figure 1). The piston is cupped as shown and has a flange which seals on the gasket.

The piston 12 has a stem, generally indicated at 13, terminating in a guiding spider 14 which works in the valve chamber. The stem 13 is counterbored at its end as indicated at 15 and cross drilled as indicated at 16, to afford a by-pass around the guiding spider 14.

The slide valve chamber is subject to pressure in a reservoir of any suitable description, for example, an auxiliary reservoir. The space to the left of the piston 12 is subject to a pressure controlled by flow through a port 17 which in a triple valve would lead to the brake pipe. The piston 12 is urged inward (to the right in Figure 1), by a coil compression spring assembly made up of two coil compression springs 18 and 19, both of which engage a spring seat 21 at the piston end, the spring 18 engaging a spring seat 22 at its outer end and the other spring, 19, engaging a different spring seat 23 at its outer end.

A stop rod 24 having two shoulders imposes different limits on the outward (leftward) motion of the spring seats 22 and 23, the parts being so arranged that both springs are mounted under initial tension, but the inner spring 19 is further stressed only after the piston has been displaced a definite distance against resistance of spring 18. The inner end of stop rod 24 enters the threaded puller hole 30 in piston 12 and thus centers the spring assembly relatively to the piston.

No novelty is here claimed for this particular spring assembly but its presence is important because as the piston moves outward against the resistance of the spring 18, the relative rotary motion of the two ends of the spring imparts a rotary tendency on the piston 12. To avoid the transmission of this tendency to the graduating valve, while assuring maintained assembly of the graduating valve and its spring with the stem, is the prime purpose of the present invention.

The stem 13 has a reduced middle portion 25 which terminates in two opposed shoulders 26 and 27. The graduating valve 28 has two upstanding laterally spaced wings 29 and has in its back a longitudinal groove 31 shorter than the valve. The wings 29 are so spaced as to receive between them the reduced portion 25 of the stem and the graduating valve 28 is of such length that it and the wings enter rather freely between the shoulders 26 and 27.

A bow spring 32 is mounted with its ends confined in the slot 31 and its middle portion reacting against the reduced portion 25 of the stem. A pair of cross pins 33 extend from wing to wing and are so spaced that when the pins are in position the valve 28 can not escape from its position between the shoulders 26 and 27, and the spring 32 can not escape from its confined position in the recess 31. At all times, the stem is free to rotate relatively to the graduating valve and is centered by piston 12 and spider 14, with the result that the rotary motion of the piston can never be imparted to the valve.

The graduating valve 28 controls ports in a main slide valve 34. This has two upstanding lateral wings 35 between which the graduating valve is received. The cross pin 36 carries a bow spring 37 which reacts against the top of the valve chamber bushing to hold the slide valve 34 to its seat. Observe that the pin 36 merely retains the assembled relation of the slide valve to the stem and does not have any function in maintaining the assembled relation of the graduating valve. It may be remarked that the main slide valve 34 has, as usual, limited lost motion between a shoulder 38 and the guiding spider 14, already described.

The construction set forth provides a graduating valve which is free of all rotary tendency and which nevertheless is maintained in proper assembled relation, even when the piston is withdrawn from the valve body.

What is claimed is:

1. A piston and slide valve assembly for use in valve bodies having a cylinder and a valve chamber formed with a ported seat for the slide valve, said assembly comprising in combination a piston adapted to fit such cylinder, and provided with a stem formed with a reduced portion between opposed shoulders, and with a spider adapted to be guided in such chamber; a main slide valve shiftable with lost motion by said stem and having wings which straddle the stem, said valve being ported to coact with said seat and having a ported seat on its back between its wings; a graduating valve coacting with the seat on the main slide valve and having wings which straddle the reduced portion of said stem between said shoulders, said graduating valve having a spring retaining recess on its back between its wings; a spring retained in said recess and reacting against said stem; and valve retaining means connecting the wings of respective valves and serving to prevent removal of the valves from said stem.

2. A piston and slide valve assembly for use in valve bodies having a cylinder and a valve chamber formed with a ported seat for the slide valve, said assembly comprising in combination a piston adapted to fit such cylinder and provided with a stem formed with a reduced portion between opposed shoulders, and with a spider adapted to be guided in such chamber; a main slide valve shiftable with lost motion by said stem and having wings which straddle the stem, said valve being ported to coact with said seat and having a ported seat on its back between its wings; a graduating valve coacting with the seat on the main slide valve and having wings which straddle the reduced portion of said stem between said shoulders, said graduating valve having a longitudinal recess on its back between said wings, said recess being somewhat shorter than the valve; a bow-spring mounted with its ends retained in said recess and reacting at its middle against said stem; and valve retaining means connecting the wings of respective valves and serving to prevent removal of the valves from the stem and the escape of said spring.

CHARLES A. CAMPBELL.